United States Patent
Xue et al.

(10) Patent No.: US 10,363,605 B2
(45) Date of Patent: Jul. 30, 2019

(54) MOLD HALVES WITH METAL-MATRIX COMPOSITE AT FEATURE AREAS

(75) Inventors: Lijue Xue, London (CA); Shaodong Wang, London (CA); Yangsheng Li, London (CA); Tony Paget, Grimsby (CA)

(73) Assignees: National Research Council of Canada, Ottawa, Ontario (CA); Garrtech Inc., Stoney Creek, Ontario (CA)

( * ) Notice: Subject to any disclaimer, the term of this patent is extended or adjusted under 35 U.S.C. 154(b) by 924 days.

(21) Appl. No.: 13/811,407

(22) PCT Filed: Jul. 21, 2011

(86) PCT No.: PCT/CA2011/000838
§ 371 (c)(1),
(2), (4) Date: Jan. 22, 2013

(87) PCT Pub. No.: WO2012/009797
PCT Pub. Date: Jan. 26, 2012

(65) Prior Publication Data
US 2013/0122193 A1 May 16, 2013

Related U.S. Application Data

(63) Continuation-in-part of application No. 12/886,936, filed on Sep. 21, 2010, now abandoned.
(Continued)

(51) Int. Cl.
*B22F 5/00* (2006.01)
*B29C 33/56* (2006.01)
*B29C 49/48* (2006.01)

(52) U.S. Cl.
CPC .............. *B22F 5/007* (2013.01); *B29C 33/56* (2013.01); *B29C 2049/4874* (2013.01); *B29C 2049/4897* (2013.01)

(58) Field of Classification Search
CPC ............ B29C 33/60; B29C 2049/4874; B29C 2049/4876; B29C 2049/4897;
(Continued)

(56) References Cited

U.S. PATENT DOCUMENTS

| 3,359,861 A | 12/1967 | Johnson et al. |
| 3,656,731 A * | 4/1972 | Larsen .................... B22C 9/061 164/138 |

(Continued)

FOREIGN PATENT DOCUMENTS

| CA | 2094369 C | * 4/2001 | ............. C22C 21/00 |
| CA | 2573336 | 7/2008 | |

(Continued)

OTHER PUBLICATIONS

Lee N. (2007) "Understanding blow molding". Hanser Publications, p. 61-70.
(Continued)

*Primary Examiner* — Joseph S Del Sole
*Assistant Examiner* — Emmanuel S Luk
(74) *Attorney, Agent, or Firm* — Jason E. J. Davis; National Research Council of Canada

(57) ABSTRACT

A mold half, especially for blow molding of thermoplastic articles, has a mold body defined at least in part by a single piece of aluminum or aluminum alloy mold material having a cavity and a pinch-off or other feature area and further having a metal-matrix composite (MMC) layer formed integrally in the mold body at the pinch-off or other feature area. A mold is fabricated from two mated mold halves. A process of producing a mold half involves machining a
(Continued)

single piece of mold material to provide a mold body having a cavity and a pinch-off or other feature area, the pinch-off or other feature area being of smaller dimension than required for the mold half, integrally forming a metal-matrix composite layer in the pinch-off or other feature area to build up the pinch-off or other feature area to at least a dimension required for the mold half. The metal-matrix composite comprises an aluminum-nickel alloy matrix (e.g. AI-12Si alloy alloyed with Ni) having WC particles embedded therein or a aluminum matrix (e.g. AI-12Si alloy) having TiC particles embedded therein and has greater wear resistance, greater strength, greater toughness or any combination thereof than the mold material.

22 Claims, 8 Drawing Sheets

Related U.S. Application Data

(60) Provisional application No. 61/366,740, filed on Jul. 22, 2010.

(58) Field of Classification Search
CPC ......... B22D 13/102; B22C 3/00; B22C 23/02; B22F 5/007; B28B 7/38; B28B 7/346; C10M 2201/053
USPC ...... 249/114.1–116, 134, 135; 427/133–135, 427/456; 425/525, 527, 531
See application file for complete search history.

(56) References Cited

U.S. PATENT DOCUMENTS

| | | | |
|---|---|---|---|
| 4,013,453 A | 3/1977 | Patel | |
| 5,021,209 A | 6/1991 | Dickinson | |
| 5,143,557 A * | 9/1992 | Pierantoni | B23K 35/286 148/512 |
| 5,296,183 A * | 3/1994 | Carbone | B29C 45/14311 264/131 |
| 5,383,779 A | 1/1995 | Robinson | |
| 5,449,536 A * | 9/1995 | Funkhouser | C23C 4/12 219/121.85 |
| 5,464,463 A * | 11/1995 | Miura et al. | 75/244 |
| 5,481,084 A * | 1/1996 | Patrick | B22D 11/008 148/222 |
| 5,641,417 A * | 6/1997 | Glagola | B23K 9/167 219/136 |
| 5,653,377 A * | 8/1997 | Reatherford | B23K 20/129 228/114.5 |
| 5,783,259 A * | 7/1998 | McDonald | 427/447 |
| 5,803,153 A * | 9/1998 | Rohatgi | 164/97 |
| 6,116,888 A * | 9/2000 | Johnston et al. | 425/195 |
| 6,284,067 B1 * | 9/2001 | Schwartz | C23C 24/10 148/525 |
| 6,439,874 B1 | 8/2002 | Buzzeo et al. | |
| 6,447,281 B1 | 9/2002 | Petre | |
| 6,497,985 B2 * | 12/2002 | McCay | B21O 51/005 219/121.61 |
| 7,220,116 B2 | 5/2007 | Tijl et al. | |
| 7,367,795 B2 | 5/2008 | Hutchinson et al. | |
| 7,531,124 B2 * | 5/2009 | Paget | 264/509 |
| 2001/0001048 A1 | 5/2001 | Yasuda et al. | |
| 2001/0055632 A1 | 12/2001 | Semersky | |
| 2002/0073982 A1 * | 6/2002 | Shaikh | C23C 24/04 123/688 |
| 2002/0084006 A1 * | 7/2002 | Chu et al. | 148/437 |
| 2003/0127775 A1 * | 7/2003 | McDonald | 264/338 |
| 2004/0177943 A1 * | 9/2004 | Rogowski et al. | 164/97 |
| 2005/0038551 A1 * | 2/2005 | Mazumder | B22F 3/1055 700/166 |
| 2005/0074597 A1 * | 4/2005 | Grinberg | B29C 70/088 428/307.3 |
| 2005/0173834 A1 * | 8/2005 | Lucek et al. | 264/319 |
| 2005/0284747 A1 * | 12/2005 | Kubota | 204/192.38 |
| 2006/0057847 A1 | 3/2006 | Yanagawa et al. | |
| 2006/0141093 A1 * | 6/2006 | Leu | 425/808 |
| 2007/0261767 A1 * | 11/2007 | Jarosinski | C22C 27/04 148/320 |
| 2008/0166444 A1 * | 7/2008 | Paget | 425/522 |
| 2008/0182102 A1 | 7/2008 | Sano et al. | |
| 2008/0206390 A1 | 8/2008 | Lappe et al. | |
| 2008/0226843 A1 * | 9/2008 | Fukubayashi | B23K 26/34 427/597 |
| 2009/0139996 A1 | 6/2009 | Jacson et al. | |
| 2009/0140469 A1 * | 6/2009 | Paget | 264/509 |
| 2009/0155404 A1 | 6/2009 | Mai | |
| 2010/0013128 A1 | 1/2010 | Larson et al. | |
| 2010/0183761 A1 * | 7/2010 | Iwami | B29C 33/3842 425/547 |
| 2011/0159138 A1 * | 6/2011 | Paget et al. | 425/525 |
| 2011/0247188 A1 * | 10/2011 | Van Rooyen | B23K 26/34 29/402.01 |
| 2012/0093674 A1 * | 4/2012 | Abe | B29C 67/0077 419/7 |
| 2012/0161369 A1 * | 6/2012 | Paget | 264/509 |
| 2013/0122193 A1 | 5/2013 | Xue et al. | |
| 2015/0336219 A1 * | 11/2015 | Bruck | B23K 9/042 427/142 |
| 2016/0052089 A1 * | 2/2016 | Mourou | B23K 26/0093 427/597 |
| 2016/0068966 A1 * | 3/2016 | Mourou | B32B 15/017 428/652 |

FOREIGN PATENT DOCUMENTS

| | | | |
|---|---|---|---|
| CA | 2806096 | 1/2012 | |
| DE | 3134474 | 3/1983 | |
| EP | 0374080 | 7/1989 | |
| EP | 742094 | 11/1996 | |
| EP | 0742094 A1 * | 11/1996 | |
| EP | 0997253 | 5/2000 | |
| FR | 2750638 | 7/1996 | |
| JP | 403257033 A * | 11/1991 | |
| JP | 4101813 | 4/1992 | |
| JP | 4041018313 A * | 4/1992 | |
| JP | 2562390 B2 * | 9/1996 | B29C 49/48 |
| JP | 2000025046 | 1/2000 | |
| JP | 2001300711 A * | 10/2001 | B22D 17/22 |
| JP | 2006116717 | 5/2006 | |
| JP | 2006116717 A * | 5/2006 | B29C 49/50 |
| JP | 02006116717 A * | 5/2006 | |
| JP | 2006130704 | 5/2006 | |
| NL | 1032865 | 4/2008 | |
| WO | 98/34744 | 2/1998 | |

OTHER PUBLICATIONS

International Search Report and Written Opinion dated Oct. 25, 2001 for PCT/CA2011/000838.
International Preliminary Report on Patentability dated Oct. 20, 2011 for PCT/CA2011/000838.
European Patent Office Communication dated Mar. 22, 2013 for European Application No. 1180911.5.
EP 11809111.5—Extended Search Report; Jul. 14, 2015.
Partial machine translation of JP 2006-116717 A, dated May 2006 obtained from the J PO website.
Partial machine translation of JP 03257033 A, dated Nov. 1991 obtained from the J PO website.
Partial machine translation of JP 04101813 A, dated Apr. 1990 obtained from the J PO website.

\* cited by examiner

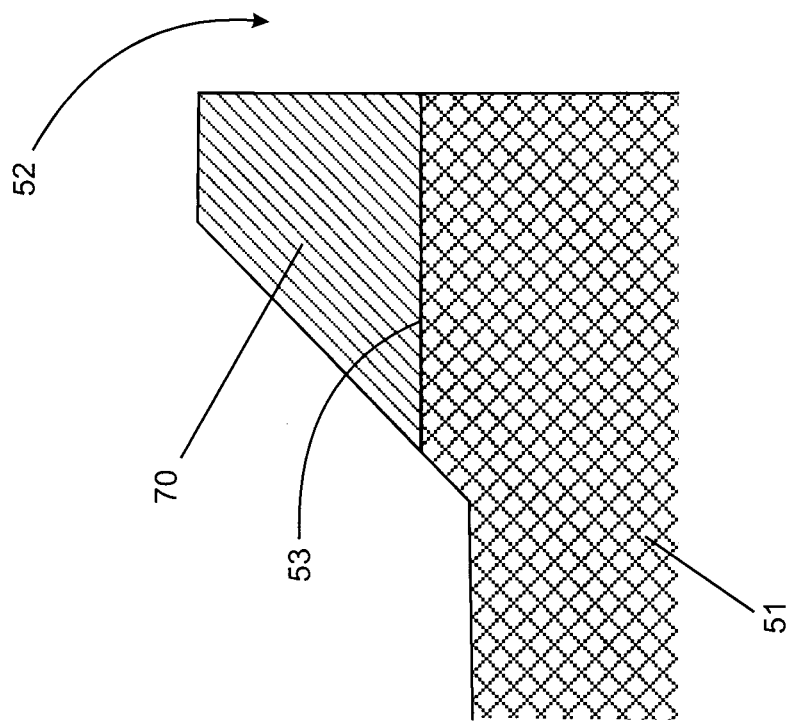
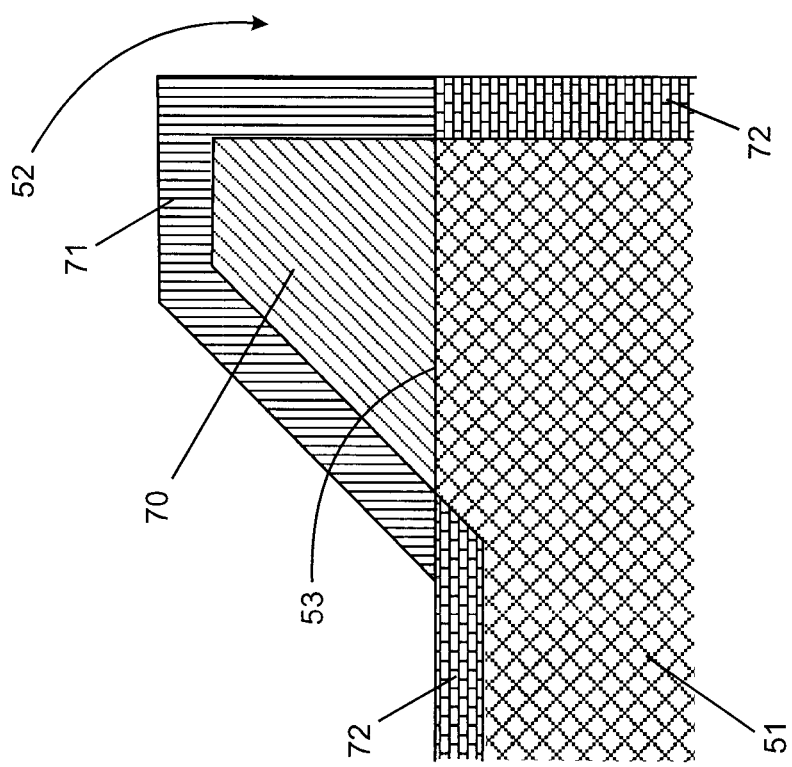

MOLD HALVES WITH METAL-MATRIX COMPOSITE AT FEATURE AREAS

CROSS-REFERENCE TO RELATED APPLICATIONS

This application is continuation-in-part of U.S. patent application Ser. No. 12/886,936, filed on Sep. 21, 2010 as a 371 of PCT/CA2011/000838, filed on Jul. 21, 2011, which claims benefit of United States Provisional Patent Application U.S. Ser. No. 61/366,740, filed on Jul. 22, 2010, the entire contents of which is herein incorporated by reference.

FIELD OF THE INVENTION

The present invention relates to molding, in particular to one-piece mold halves, especially for blow molding.

BACKGROUND OF THE INVENTION

Blow molding is a manufacturing process by which hollow plastic parts (such as containers) are formed. It is a process used to produce hollow objects from thermoplastic. The blow molding process begins with melting down the plastic and forming it into a parison or preform. A parison is a tube-like piece of plastic with a hole in one end in which compressed air can pass through. A preform is a molded shape that is prepared prior to the actual blow molding step and then heated to a softened state for blow molding purposes. The basic process has two fundamental phases. First, a parison (or preform) of hot plastic resin is created. Second, a pressurized gas, usually air, is used to expand the hot parison or preform and press it against a mold cavity formed by mold halves. The pressure is held until the plastic cools. Once the plastic has cooled and hardened the mold halves open up and the part is ejected. The mold halves usually have internal cooling channels and/or heating elements to cool or heat the mold as necessary at the required locations.

When mold halves are closed together during the molding process they pinch portions of the parison together to form seals at "pinch-off" areas, but excess parison material at the pinch-off areas is not completely cut away. Protruding edges are cut nearly through, creating an airtight closure by pinching the parison along the tail, shoulder and handle areas which makes it easy to break off or otherwise remove the excesses pieces. One method of obtaining more uniform welding lines is to build "dams" into mold halves at the parison pinch-off areas. These dams force some of molten resin back into the mold cavities to produce stronger weld lines. Mold halves are also required to provide features such as threaded necks that receive caps, and "push-ups" (hollows formed in the base of the containers to provide stability). Because, the mold halves at the pinch-off and feature areas are subjected to comparatively high pressure and mechanical stress, wear damage typically occurs at these areas.

Aluminum alloys are typically used to make blow mold halves due to their good thermal conductivity, light weight and ease of machining. However, aluminum alloys are usually soft and have relatively inferior wear resistance. In order to extend mold life, inserts made of hard and tough metals (typically, beryllium-copper or hardened steel) are used at the pinch-off area as well as areas that provide special features in the aluminum mold (FIG. 1). However, these inserts have to be machined separately from and fastened onto the mold halves, which significantly increases the complexity of the mold design and increases production cost and time for manufacturing and assembling of these inserts. Due to the addition of these inserts, cooling channels have to be designed beneath the inserts, which may restrict the effectiveness of the cooling. In addition, beryllium-copper material typically used to make these inserts is quite expensive and more difficult to machine.

One-piece blow mold halves that eliminate insert segments (FIG. 2) simplify mold design, as they reduce the effort expended to ensure that the various inserts align properly with one another upon assembly. One-piece molds may be constructed relatively quickly, as compared to molds with insert segments, and at low cost. Heat transfer performance is also enhanced over segmented molds, as thermal breaks formed by the junctions of aligned parts are eliminated.

Methods are known that use explosive cladding (or roll cladding, diffusion bonding, etc.) to metallurgically bond a very hard metal layer (such as steel, titanium, etc.) to a softer but very thermally conductive metal substrate (such as an aluminum alloy) to produce blow molds. One problem with technologies such as these is that the layer of very hard metal has different thermal properties than the substrate leading to cracking, especially under prolonged usage. Extra layers of other thermally conductive material may be employed to mitigate against cracking, but this complicates the process and does not satisfactorily address the cracking problem.

There remains a need in the art for further improvement to molds and molding methods.

SUMMARY OF THE INVENTION

Thus, there is provided a mold half comprising a mold body defined at least in part by a single piece of aluminum or aluminum alloy mold material comprising a cavity and a feature area and further comprising a layer of a metal-matrix composite (MMC) formed integrally therein at the feature area, the MMC comprising an aluminum-nickel alloy matrix having WC particles embedded therein or an aluminum matrix having TiC particles embedded therein.

There is further provided a mold comprising two mold halves of the present invention mated to receive a molding substance.

There is further provided a process of producing a mold half comprising: machining a single piece of aluminum or aluminum alloy mold material to provide a mold body comprising a cavity and a feature area, the feature area being of smaller dimension than required for the mold half; and integrally forming a layer of a metal-matrix composite (MMC) in the feature area to build up the feature area to at least a dimension required for the mold half, the MMC comprising an aluminum-nickel alloy matrix having WC particles embedded therein or an aluminum matrix having TiC particles embedded therein.

The feature area may be, for example, one or more of a pinch-off area, a bottle top, threads for a bottle cap, a bottle shoulder, moil or dome flash sections, a handle eye, a tail or bottom, a compression molded feature (e.g. a strengthening web, a sliding core) or a retractable insert. A layer of the MMC may be formed integrally in one, more or all of the feature areas.

The MMC layer comprises an aluminum matrix. For the aluminum matrix, aluminum alloys are particular useful, for example Al 2024 all, Al 2124 all, Al 2219 T31 through T87, Al 6009 all, Al 6010 all, Al 6061 T4 through T6511, Al 7075 T6 through T7351, Al 7050 all and Al 7475 all. Al-12Si alloys are particularly preferred. Al-12Si alloys are identified in the art as Al 4047 and comprise aluminum alloyed with about 11-13 wt % (nominally about 12 wt %) silicon, based on total weight of the alloy. Embedded in the relatively soft aluminum matrix are hard and wear resistant particles of a tungsten carbide (WC) or titanium carbide (TiC). When WC particles are embedded, the aluminum matrix is an aluminum-nickel alloy matrix. When TiC particles are embedded, the aluminum matrix is a matrix without alloyed nickel.

The nickel in the aluminum-nickel alloy matrix may be alloyed with the aluminum alloy prior to embedding the tungsten carbide (WC) particles, or more preferably, during the embedding process. During the embedding process, a WC/Ni material may be used in which the nickel acts as a binder for the WC particles in the material. During the embedding process, the nickel is melted and dissolves in the aluminum alloy to form the aluminum-nickel alloy matrix while the WC particles are only partially melted and remain as hard particulates embedded in the matrix. The Ni that dissolves in the aluminum alloy interacts with the aluminum alloy to form intermetallics that further increase matrix hardness.

WC or TiC particles are embedded in the matrix in any amount suitable to provide sufficiently greater wear resistance, strength and/or toughness at the feature areas to satisfactorily extend the working life of the mold. The amount of WC or TiC distributed in the matrix is preferably in a range of from about 5 wt % to about 50 wt %, based on the weight of the composite, more preferably about 10-40 wt %, for example about 20-35 wt %. When used, the amount of nickel alloyed in the matrix of the composite is preferably in a range of from about 1.5 wt % to about 5.5 wt %, based on the weight of the composite, more preferably about 2.4-3.6 wt %, for example about 3 wt %.

The MMC layer has greater wear resistance, strength and/or toughness than the aluminum or aluminum alloy into which the MMC is integrally formed, thereby providing greater resistance to high pressures and mechanical stresses during the molding process when mold halves are closed together. Further, the MMC layer has good bonding and compatibility to the mold material so that the interface and surrounding areas will not induce crack or peel-off during the molding operation. The MMC has a similar coefficient of thermal expansion compared to the mold material, which reduces the likelihood of cracking or other damage to the mold half due to changes in temperature.

The mold material comprises aluminum or an aluminum alloy. Some examples of suitable aluminum alloys include Al 2024 all, Al 2124 all, Al 2219 T31 through T87, Al 6009 all, Al 6010 all, Al 6061 T4 through T6511, Al 7075 T6 through T7351, Al 7050 all and Al 7475 all. It should be noted that all aluminum alloys are suitable for blow molds due to their excellent thermal properties but those with high strength and heat treated properties are generally chosen due to their improved wear, strength and thermal properties.

The MMC layer may be formed in the feature area by any suitable process. The MMC layer may be formed by adding the MMC material to, or by otherwise modifying the surface of, the mold body in the feature area. In some instances, it may be desirable to form the MMC layer in different feature areas using different processes. The process or processes used to add and/or modify the feature area are preferably very well controlled so that the features are accurately engineered at the desired locations and are integrally formed in the mold body, e.g. by metallurgical bonding. Preferably, the process has minimal effect on the mold material in order to reduce potential distortion and property deterioration of the mold body. Thickness of the MMC layer depends on the mold working conditions and the process used to create the layer. For example, thicknesses may be from about several nanometers to several tens of millimeters.

The present invention is particularly suited for one-piece molds and mold halves, i.e. mold halves that are wholly defined by a single piece of aluminum or aluminum alloy. However, in some cases, the mold half may comprise an insert in one or more parts where it is not desired to integrally form an MMC layer.

In one preferred embodiment, an MMC layer may be formed by first engineering a mold body in which feature area is machined to an undersized dimension, and then adding MMC material to the feature area to build up the feature to final dimension. In a variation of this embodiment, the feature area may be built up with MMC material beyond final dimension and then machined down to final dimension.

Various processes may be used to form the MMC layer. Such processes include, for example, laser cladding, laser alloying, electron beam cladding, electron beam alloying, brazing, diffusion bonding, friction stir welding, laser assisted thermal spray, laser assisted cold spray, low heat input welding (e.g. micro plasma welding), aluminum anodizing, ion implantation, chemical vapor deposition, plasma enhanced physical vapor deposition, diffusion coating, plasma treating, electroplating and electroless plating.

Laser cladding is a process that enables metallurgical bonding of MMC material to the mold body to build up a relatively thick layer of the MMC layer in the feature area. Compared to conventional welding, laser cladding involves much better control and much less heat input, which reduces distortion and property deterioration in the mold body. As a variation, laser alloying may be used to melt the surface layer of the mold body to permit addition of various alloying elements to enhance surface hardness and wear resistance in the feature area. In another variation, an electron beam may be used instead of or in addition to a laser as the heating source for cladding.

The present invention combines the advantages of both traditional molds with insert segments and one-piece molds. The present invention preferably uses one-piece mold halves that eliminate or reduce the number of insert segments, which significantly simplifies mold design, reduces purchasing and inventory controls, simplifies manufacturing and simplifies assembling. As a result, molds of the present invention may be constructed relatively quickly and at lower cost. In addition, improved heat transfer/thermal management of the molds of the present invention is permitted through (a) eliminating thermal breaks between the inserts and mold bodies, (b) permitting construction of cooling channels at the original insert areas, and (c) enabling addition of low thermal conductive material at the top of the feature area to help to produce strong and even weld lines.

One-piece mold halves use one metal to construct the mold bodies including the feature areas. One-piece mold halves are generally manufactured using aluminum alloys for making prototype or small run containers as opposed to mass production. In the present invention, the feature areas are built up and/or enhanced with a specifically engineered MMC material. The specific requirements for each feature area can be met by tailoring the specifically engineered MMC material without affecting the material used to make mold bodies. Metallurgical bonding between the MMC material and the mold material offers good compatibility between the two materials, which ensures long life of the feature areas during high pressure and high cycle molding operations. As a result, the present invention permits mass production of molded articles.

Further, molds having a very hard metal layer (such as steel, titanium, etc.) metallurgically bonded to a softer but very thermally conductive aluminum or aluminum alloy substrate suffer from thermal incompatibility between the cladding layer and the mold body leading to cracking, thereby shortening the effective working life of the mold. The present molds combine wear resistance, strength and/or toughness with good thermal compatibility at the feature areas to provide molds with significantly extended working lives.

Furthermore, the present invention may be used not only on flat parting surfaces but may also be advantageously used on contoured parting surfaces. There is no restriction on mold size, the present molds being applicable to both large and small size molds. Molds of the present invention may be used for any molding process, for example, blow molding, injection molding and compression molding. The present invention is particularly useful for blow molding processes. The present invention is particularly useful for molding of plastics, particularly thermoplastics.

The present invention may be used to produce any article that may be formed using a molding process. Some examples of articles include containers (e.g. bottles), automotive components, recreational components, industrial components and chemical components, especially containers.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 4 is a schematic drawing of one embodiment of a metal-matrix composite (MMC) layer integrated on to the mold half of FIG. 3 at the pinch-off area, where FIG. 4A shows the MMC layer with an initial excess of MMC material and FIG. 4B shows the MMC layer after being machined to final dimension;

DESCRIPTION OF PREFERRED EMBODIMENTS

Figure 1:
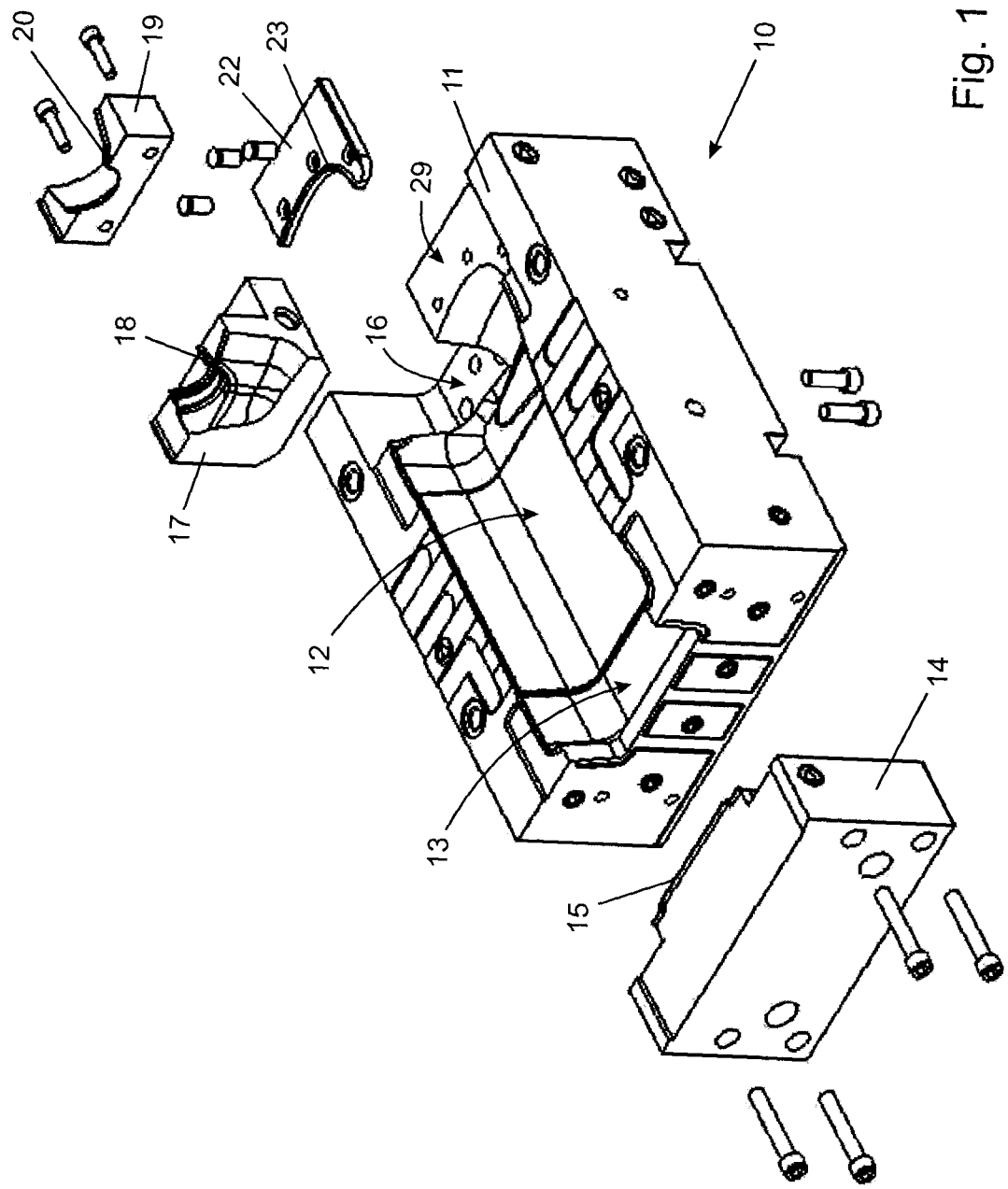
FIG. 1 is a schematic drawing of a traditional blow mold half with insert segments.

FIG. 1 depicts a traditional blow mold half for a bottle blow mold in which insert segments are used in the pinch-off and other feature areas. Thus, mold half 10 comprises mold body 11 having cavity 12. Pinch-off insert segment 14 comprising raised pinch-off area 15 is inserted into pinch-off insert area 13 of the mold body and secured to the mold body by bolts. Bottle top thread insert 17 comprising raised thread feature 18 and bottle top insert 19 comprising raised bottle top feature 20 are inserted into bottle top feature insert area 16 of the mold body and secured to the mold body by bolts. Bottle shoulder insert 22 comprising raised shoulder feature 23 is inserted into shoulder insert area 29 of the mold body and secured to the mold body by bolts.

Figure 2:
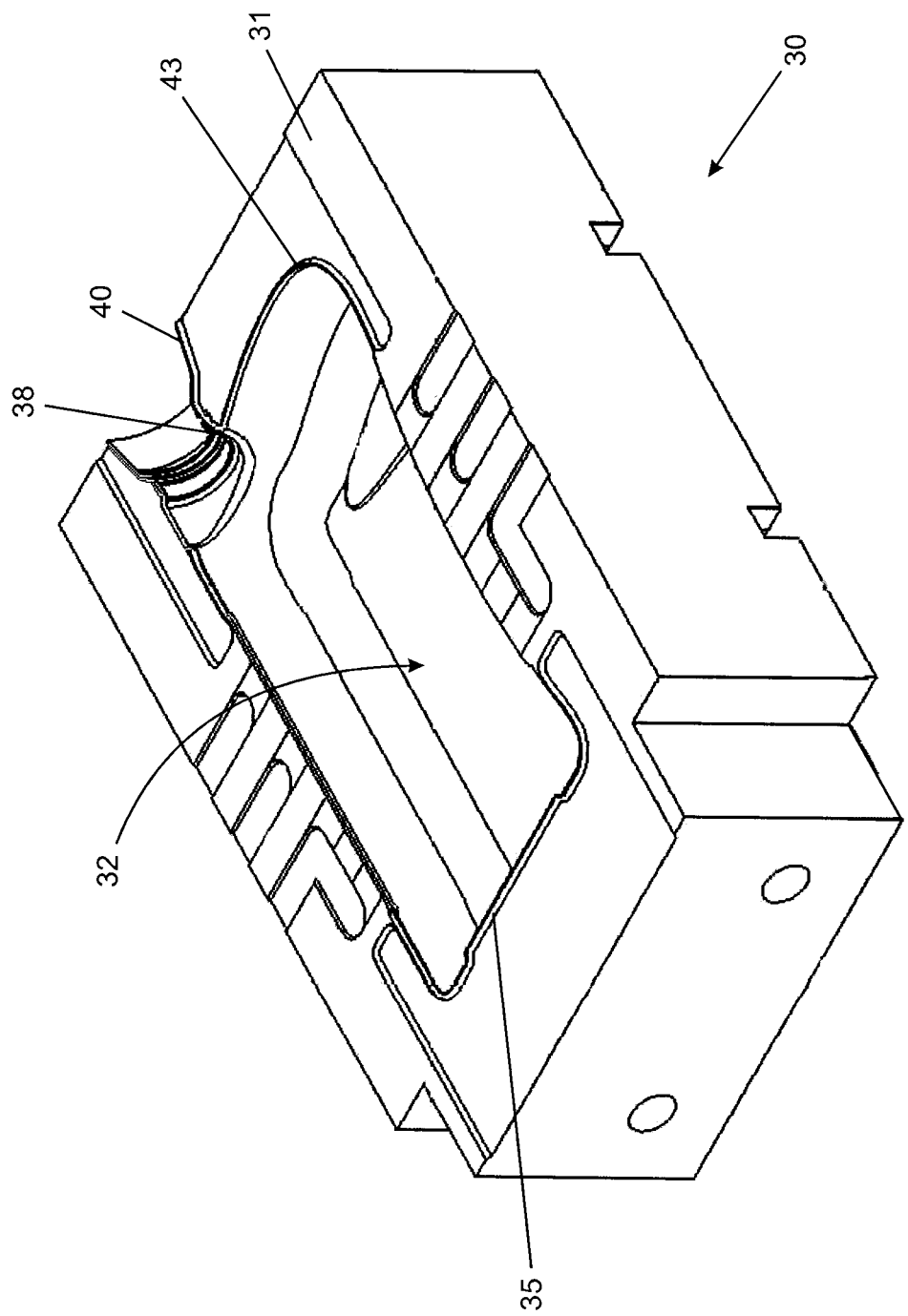
FIG. 2 is a schematic drawing of a one-piece blow mold half in accordance with U.S. Pat. No. 7,531,124.

FIG. 2 depicts a one-piece blow mold half for a bottle blow mold in accordance with U.S. Pat. No. 7,531,124. Mold half 30 comprises mold body 31 having cavity 32, raised pinch-off area 35, raised thread feature 38, raised bottle top feature 40 and raised shoulder feature 43. The mold body, pinch-off area and all three features comprise the same mold material.

Figure 3:
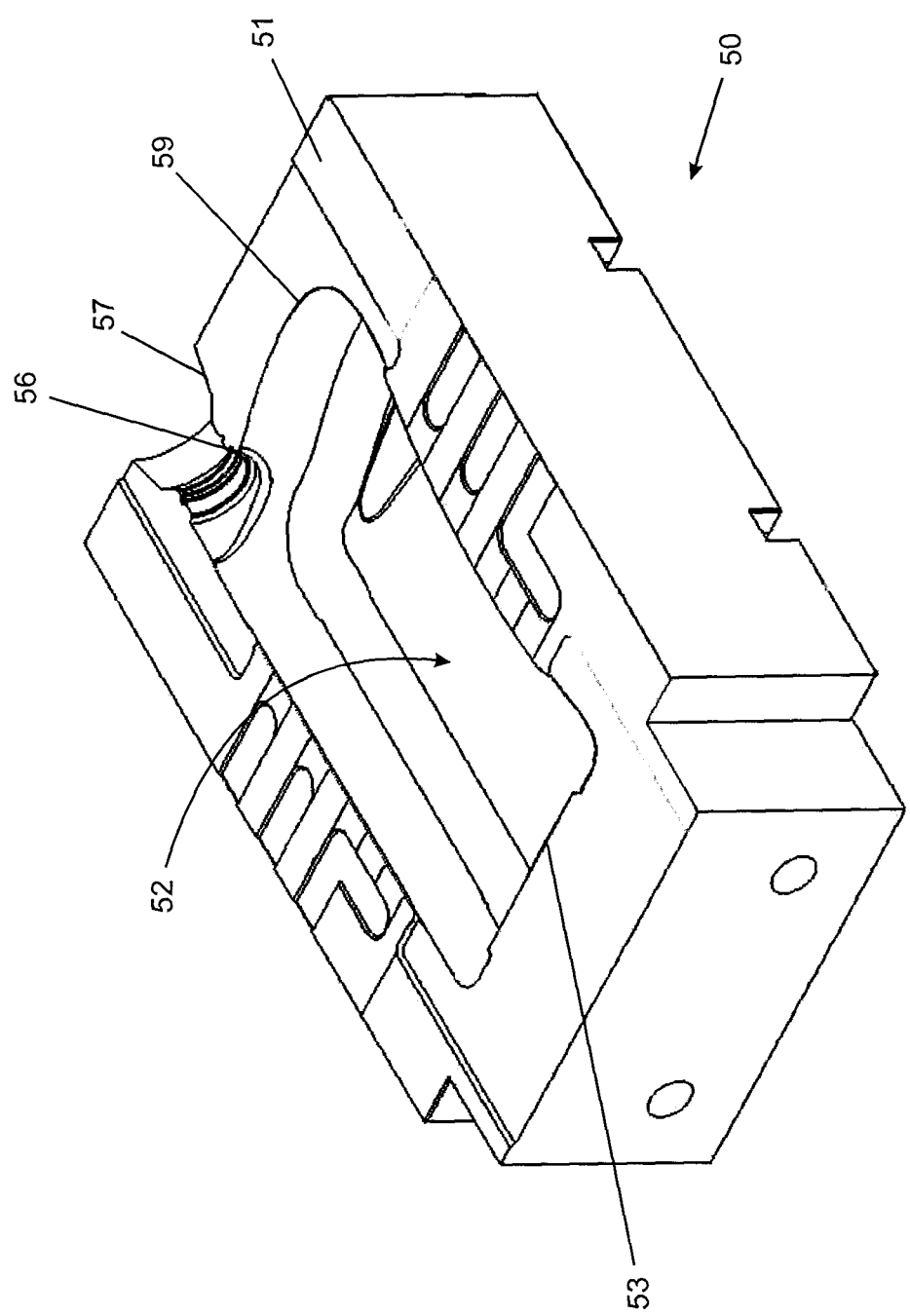
FIG. 3 is a schematic drawing of one embodiment of a one-piece blow mold half pre-machined to an undersized shape at the pinch-off and other feature areas.
Figure 5:
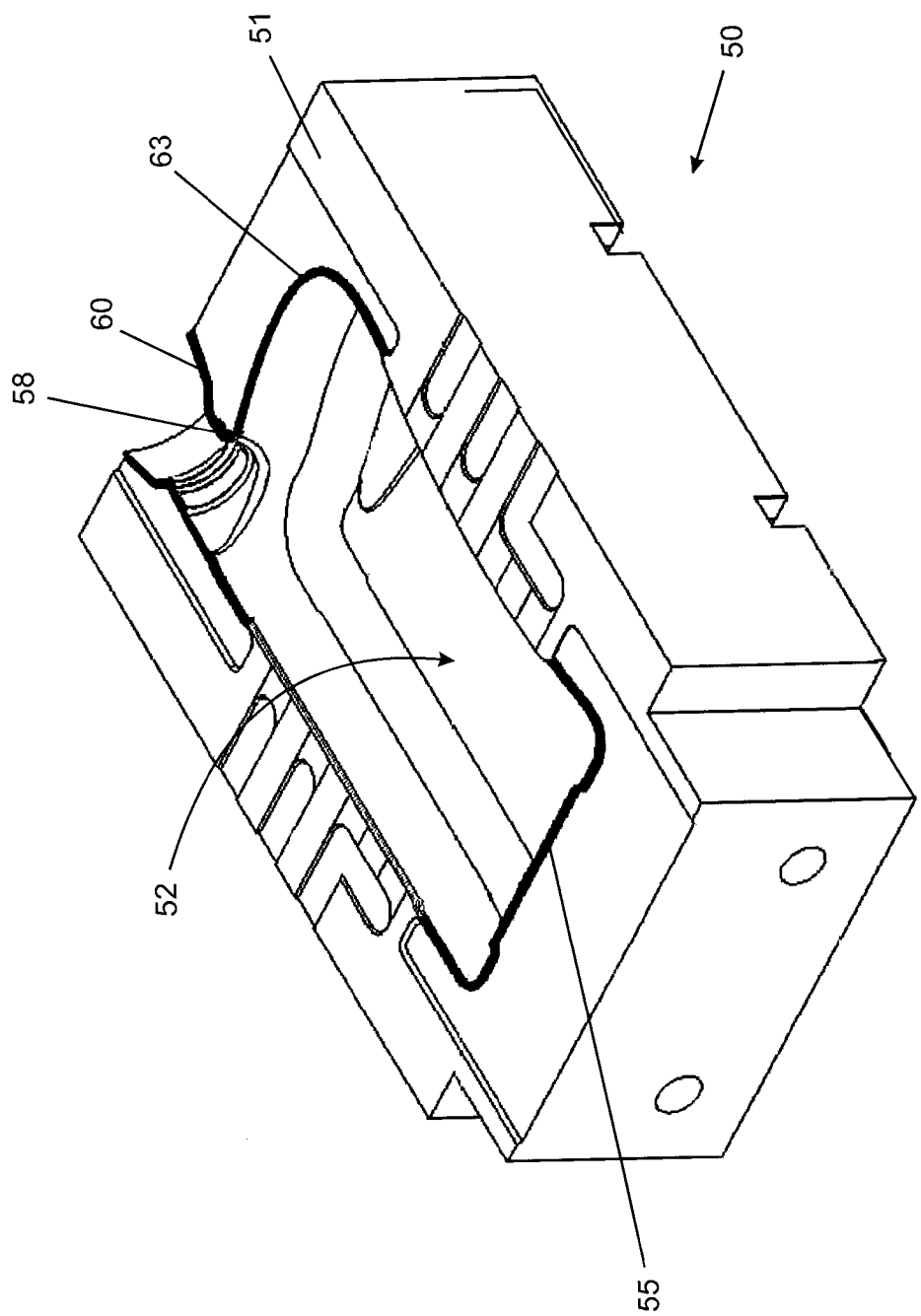
FIG. 5 is a schematic drawing of a one-piece blow mold half of the present invention having a metal-matrix composite layer integrated at the pinch-off and other feature areas.

FIGS. 3-5 depict one embodiment of a one-piece blow mold half for a bottle blow mold in accordance with the present invention at various stages of fabrication. Referring to FIG. 3, one-piece blow mold half 50 comprising aluminum alloy mold body 51 and cavity 52 is pre-machined to an undersized shape at pinch-off area 53, thread feature area 56, bottle top feature area 57 and shoulder feature area 59. Referring to FIG. 4A, in order to complete the mold half, a layer of MMC material is laser clad at pinch-off area 53 (and the other feature areas not shown in FIG. 4) to provide raised layer 70 of the cladding material having excess portion 71. In order to avoid undercut and/or mismatch, mold body 51 at each side of raised layer 70 is rough machined prior to the laser cladding step to leave spare layer 72 of mold material at each side of raised layer 70. After the cladding step, spare layer 72 is machined off along with excess portion 71 of the cladding material to bring mold body 51 and raised layer 70 to final dimension (FIG. 4B). For certain processes, the spare layer may not be necessary provided no undercut and/or mismatch between the MMC material and the mold body occurs. Referring to FIG. 5, after cladding, one-piece blow mold half 50, having mold body 51 and cavity 52, comprises clad pinch-off area 55 and clad other feature areas 58, 60 and 63 in which an MMC layer is integrally formed.

Example 1

Laser Cladding of Al 7075-T651 Substrate with Al 4047+WC/Ni

Laser cladding was performed by using a focused Nd:YAG laser beam with a 115-mm focal length lens. A powder feeder was used to simultaneously deliver Al 4047 and WC/Ni powder mixture through a feed nozzle into the melt pool at a rate of about 2 g/min. The laser beam and powder feeding nozzle were kept stationary, while the Al-7075-T561 substrate was moved under the beam by a CNC motion system. The cladding was conducted with an average laser power up to 500 W with a beam diameter of about 1 mm. A laser pulse duration of 10 ms and a frequency of 10 Hz were used for the processing. An overlap ratio of 30% was used between passes to produce multi-passes to cover the required area, while a z movement of about 130 μm was used to deposit multi-layers to reach the required height.

Example 2

Laser Cladding of Al 7075-T651 Substrate with Al 4047+TiC

Laser cladding was performed by using a focused Nd:YAG laser beam with a 115-mm focal length lens. A powder feeder was used to simultaneously deliver Al 4047 and TiC powder mixture through a feed nozzle into the melt pool at a rate of about 2 g/min. The laser beam and powder feeding nozzle were kept stationary, while the Al-7075-T561 substrate was moved under the beam by a CNC motion system. The cladding was conducted with an average laser power up to 500 W with a beam diameter of about 1 mm. A laser pulse duration of 10 ms and a frequency of 10 Hz were used for the processing. An overlap ratio of 30% was used between passes to produce multi passes to cover the required area, while a z movement of about 200 μm was used to deposit multi-layers to reach the required height.

Example 3

Microstructure Analysis of Clad Substrates

In a preliminary experiment, a layer of Al 4047 (which is the matrix material of the metal-matrix composite) was laser clad on to Al 7075-T651 substrate by a modification of the procedure of Example 1 in order to examine the microstructure of the clad specimen. This was compared to a similar specimen in which a layer of Al 7075 was clad on to Al 7075-T651 substrate. Examination by optical microscopy of a cross-section of the specimens showed that cladding with Al 7075 showed a tendency for cracking while cladding with Al 4047 produce a good metallurgical bond without inducing cracks or pores in the clad layer. Further, the laser clad Al 4047 layer showed good machinability, a smooth transition of hardness from the substrate to the clad layer, and a generally uniform hardness through the layer. Finally, a polishing test showed that the laser clad Al 4047 layer is superior to the Al 7075-T651 substrate in polishing.

Figure 6A:
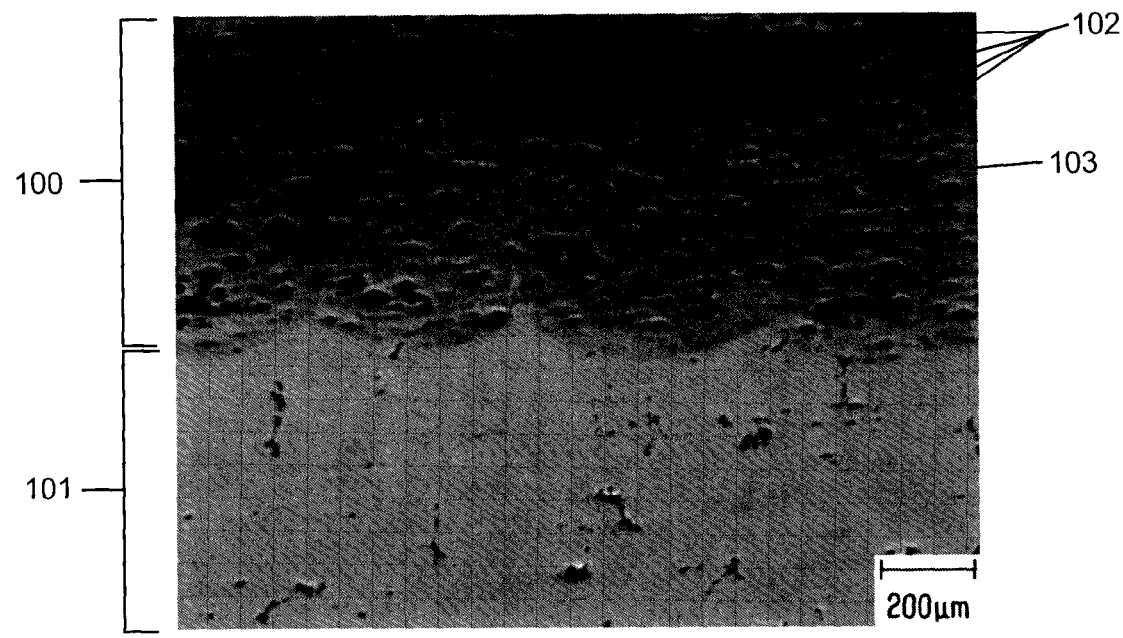
FIG. 6A depicts microstructure of a cross-section of a Al 7075-T651 substrate clad with a Al 4047+30% (90% WC+10% Ni) metal-matrix composite layer.

With reference to FIG. 6A, microstructure analysis was extended to a metal-matrix composite (MMC) in which Al 4047+30% (90% WC+10% Ni) MMC layer 100 was laser clad on to Al 7075-T651 substrate 101 in accordance with the process in Example 1. The MMC comprises WC particles embedded in an Al 4047/Ni matrix formed using 30 wt % WC/Ni material. The WC/Ni material consists of 90 wt % WC (tungsten carbide) and 10 wt % Ni (nickel). Thus, the amount of WC in the MMC layer is about 27 wt % and the amount of nickel alloyed with the Al 4047 is about 3 wt %, based on the weight of the MMC. A good metallurgical bond was formed with no formation of cracks or pores in the MMC layer. Further, in the MMC layer, WC hard particles 102 were evenly distributed in Al 4047/Ni matrix 103, while the Ni from the WC/Ni material dissolved in the Al 4047 to form intermetallics that further increase matrix hardness. Similar experiments were performed with other metal-matrix composites, i.e. Al 4047+$Al_2O_3$ and Al 4047+WC/Co. In the case of Al 4047+$Al_2O_3$, laser cladding did not generate hardening, probably due to the decomposition of $Al_2O_3$ during the cladding process. In the case of Al 4047+WC/Co, the clad layer had improved wear resistance but showed a tendency to crack.

Figure 6B:
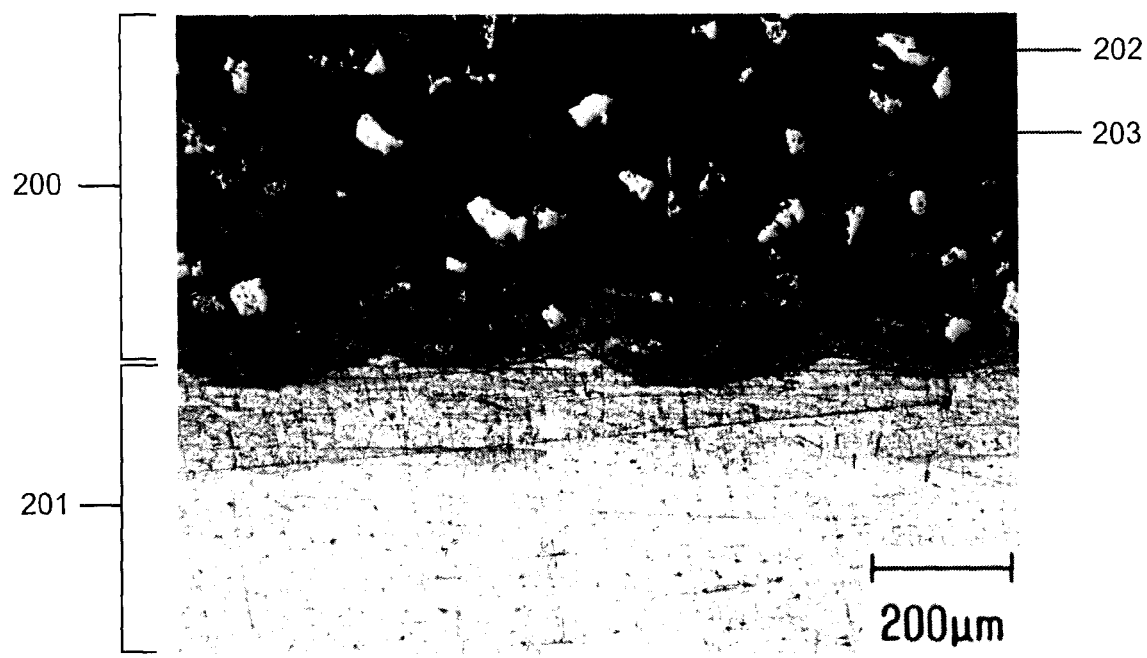
FIG. 6B depicts microstructure of a cross-section of a Al 7075-T651 substrate clad with a Al 4047+30% (TiC) metal-matrix composite layer.

With reference to FIG. 6B, microstructure analysis was extended to a metal-matrix composite (MMC) in which Al 4047+30% (TiC) MMC layer 200 was laser clad on to Al 7075-T651 substrate 201 in accordance with the process in Example 2. The MMC comprises TiC particles embedded in an Al 4047 matrix formed using 30 wt % TiC material. A good metallurgical bond was formed with no formation of cracks or pores in the MMC layer. Further, in the MMC layer, TiC hard particles 202 were evenly distributed in Al 4047 matrix 203.

Example 4

Microhardness Analysis of Clad Substrates

Figure 7:
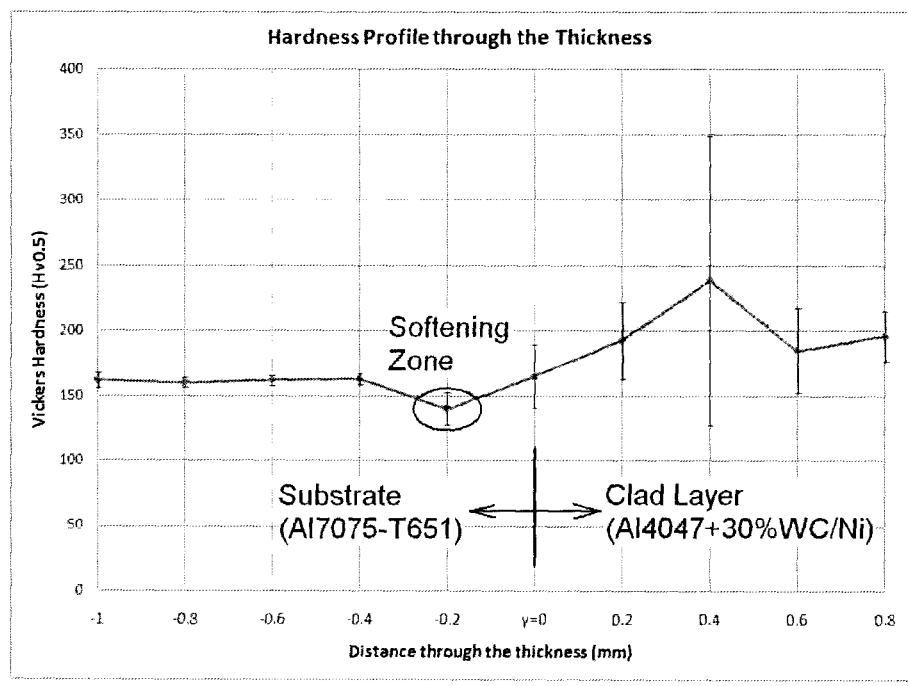
FIG. 7 depicts a graph showing hardness depth profile of Al 4047+30% (90% WC+10% Ni) metal-matrix composite layer clad on Al 7075-T651 substrate.

A Vickers hardness test (ASTM E384-10e2) was conducted on the laser clad products of Examples 1 and 2 using a load of 500 g for 15 s at evenly distributed points spaced by 0.2 mm. FIG. 7 depicts hardness depth profile of the Al 4047+30% (90% WC+10% Ni) MMC layer clad on the Al 7075-T651 substrate. It is evident from FIG. 7 that the Al 4047+30% (90% WC+10% Ni) is harder than the Al 7075-T651 substrate. The substrate near the clad layer has a softening zone with a Vickers hardness (Hv0.5) of around 140, perhaps due to annealing induced by laser cladding. There was a larger deviation in the hardness of laser clad (Al 4047+30% (90% WC+10% Ni)) layer due to heterogeneous features in the MMC.

Figure 8:
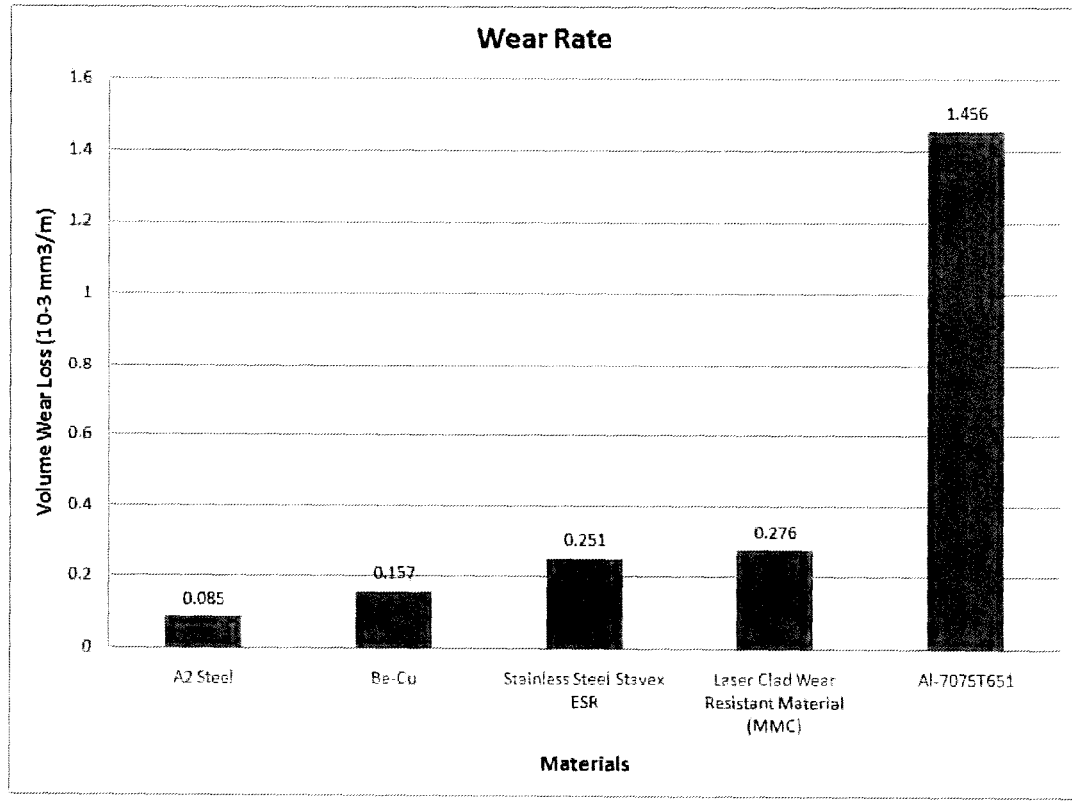
FIG. 8 depicts a graph comparing Vickers hardness of Al 4047+30% (90% WC+10% Ni) metal-matrix composite layer to that of Al 7075-T651, A2 steel, Be—Cu alloy and Stainless Steel Stavex ESR; and, FIG. 9 depicts a graph comparing wear loss of Al 4047+ 30% (90% WC+10% Ni) and Al 4047+30% (TiC) metal-matrix composite layer to that of Al 7075-T651, A2 steel, Be—Cu alloy and Stainless Steel Stavex ESR.

Further, with reference to FIG. 8, Vickers hardness of the Al 4047+30% (90% WC+10% Ni) MMC layer was compared to that of the Al 7075-T651 and other typical mold insert materials (i.e. A2 steel, Be—Cu alloy and Stainless Steel Stavex ESR). Table 1 summarizes the results and includes the hardness of the Al 4047+30% (TiC) MMC layer. Table 1 and FIG. 8 demonstrate that the Al 4047+30% (90% WC+10% Ni) layer is harder than Al 7075-T651 and approaches that of the steels. Table 1 demonstrates that the Al 4047+30% (TiC) layer is somewhat softer than Al 7075-T651.

TABLE 1

| Material | Vickers Hardness (Hv0.5) |
|---|---|
| A2 steel | 222 |
| Be—Cu alloy | 384 |
| Stainless Steel Stavex ESR | 231 |
| Al 4047 + 30% (90% WC + 10% Ni) | 198 |
| Al 4047 + 30% (TiC) | 141 |
| Al 7075-T651 | 177 |

Vickers Hardness

Example 5

Wear Resistance Analysis of Clad Substrates

Wear resistance was performed with pin-on-disc testing as per ASTM G99-05 (2010) to evaluate sliding wear resistance of a laser-clad specimen of the present invention (Al 4047+30% (90% WC+10% Ni) on Al 7075-T651; Al 4047+30% (TiC) on Al 7075-T651) in comparison to Al 7075-T651, A2 steel, Be—Cu and Stainless Steel Stavex ESR. The test was performed with a Falex Pin-on-Disc Tester with a dry slide to determine volume wear loss. All sample surfaces were fine ground and cleaned before testing. The testing was done with a normal load of 3.5 N, at a linear slide speed of 300 mm/s over a total slide distance of 1500 m using a ¼" tungsten carbide (WC) ball.

Figure 9:
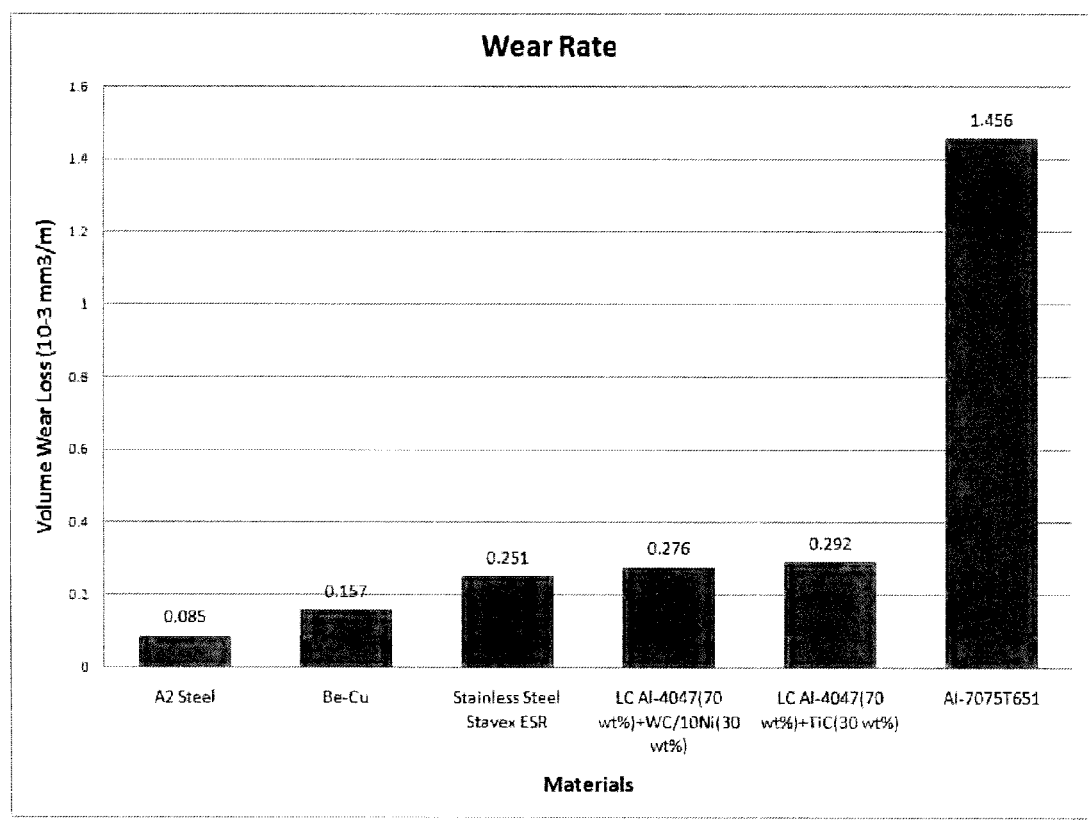

Wear loss results from the pin-on-disc testing are shown in FIG. 9 and summarized in Table 2. Using wear of Al 7075-T651 substrate as a reference, relative wear resistance (R) was calculated by dividing volume wear loss of Al 7075-T651 by volume wear loss of the other materials. Wear resistances of the clad Al 4047+30% (90% WC+10% Ni) and Al 4047+30% (TiC) in accordance with the present invention are significantly better (5.28 and 4.99 times, respectively) than that of the Al-7075-T651 substrate. The wear resistances of the Al 4047+30% (90% WC+10% Ni) and Al 4047+30% (TiC) layers are similar to that of Stavex Stainless Steel. The wear resistances of the Al 4047+30% (90% WC+10% Ni) and Al 4047+30% (TiC) layers are close to but still relatively inferior to that of Be—Cu.

TABLE 2

| | Wear Loss | |
|---|---|---|
| Material | Volume Wear Loss ($10^{-3}$ mm$^3$/m) | Relative Wear Resistance (R) |
| A2 steel | 0.085 | 17.1 |
| Be—Cu alloy | 0.157 | 9.27 |
| Stainless Steel Stavex ESR | 0.251 | 5.80 |
| Al 4047 + 30% (90% WC + 10% Ni) | 0.276 | 5.28 |
| Al 4047 + 30% (TiC) | 0.292 | 4.99 |
| Al 7075-T651 | 1.456 | 1 |

Cladding of an aluminum or aluminum alloy substrate with a Al 4047+30% (90% WC+10% Ni) or Al 4047+30% (TiC) metal-matrix composite provides an excellent balance of properties for molding, especially blow molding, applications. The clad metal-matrix composite layer forms a good metallurgical bond with the substrate with no formation of cracks or pores. Excellent hardness and wear resistance for Al 4047+30% (90% WC+10% Ni), approaching that of materials used in the prior art, and excellent wear resistance for Al 4047+30% (TiC) leads to extended life at feature areas of the mold, while good thermal compatibility between the substrate and metal-matrix composite layer makes the MMC layer less prone to cracking further extending the life of the mold. Good machinability provides for ease of manufacturing.

In contrast, Al 7075-T651 itself is soft and easily worn, therefore its use at feature areas in one-piece molds results in reduced service life of the molds. Use of typical hard, wear resistant materials such as steels and Be—Cu alloy at feature areas extends working life of aluminum or aluminum alloy molds, but is still unsatisfactory since thermal incompatibility leads to cracking which prevents a full realization of the benefits of the harder material. Further, such hard, wear resistant materials are difficult to machine, which makes manufacturing more difficult.

REFERENCES

The contents of the entirety of each of which are incorporated by this reference.

Dickinson A, et al. (1991) "Process for forming an extrusion-blow molded ultrathin container using a heat generating pinch off arrangement". U.S. Pat. No. 5,021,209 issued Jun. 4, 1991.

Kobayashi S. (1996) "Blow molding die and method of manufacturing same". European Patent Publication 742,094 published Nov. 13, 1996.

Lee N. (2007) "Understanding blow molding". Hanser Publications, p. 61-70.

Paget T. (2009) "One-piece blow mold halves for molding a container". U.S. Pat. No. 7,531,124 issued May 12, 2009.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A mold half comprising a mold body defined at least in part by a single piece of aluminum or aluminum alloy mold material, the single piece defining a mold cavity by a cavity surface having a shape for imparting to a part of a molded article, the cavity surface including a feature area comprising a layer of a metal-matrix composite (MMC) formed integrally therein, the MMC comprising an aluminum-nickel alloy matrix having WC particles embedded therein or an aluminum matrix having TiC particles embedded therein, and the cavity surface defined by the aluminum or aluminum alloy away from the feature area.

2. The mold half according to claim 1, wherein the WC or TiC particles are distributed in the matrix in an amount in a range of from 5 wt % to 50 wt %, based on the weight of the composite.

3. The mold half according to claim 1, wherein the WC or TiC particles are distributed in the matrix in an amount in a range of from 20 wt % to 35 wt %, based on the weight of the composite.

4. The mold half according to claim 1, wherein the MMC is formed by cladding a powder mixture onto the cavity surface at the feature area, the powder mixture comprising an Al-12Si alloy.

5. The mold half according to claim 1, wherein the MMC comprises the aluminum-nickel alloy matrix having embedded WC particles.

6. The mold half according to claim 5, wherein the WC particles are distributed in the aluminum-nickel alloy matrix in an amount of about 27 wt %, based on the weight of the composite.

7. The mold half according to claim 1, wherein the MMC comprises the aluminum alloy matrix having embedded TiC particles.

8. The mold half according to claim 7, wherein the TiC particles are distributed in the aluminum matrix in an amount of about 30 wt %, based on the weight of the composite.

9. The mold half according to claim 5, wherein the MMC comprises 1.5-5.4 wt % Ni, based on weight of the composite.

10. The mold half according to claim 1, wherein the aluminum or aluminum alloy away from the feature area comprises an Al alloy of any one of Al 7075-T6 through T7351.

11. The mold half according to claim 1, wherein the MMC is formed integrally with the mold cavity, and comprises a metallurgical bond between the metal-matrix composite and the aluminum or aluminum alloy.

12. The mold half according to claim 1, wherein the feature area comprises a pinch-off area.

13. The mold half according to claim 1, wherein the aluminum or aluminum alloy away from the feature area is a single piece of aluminum or aluminum alloy mold material.

14. A mold comprising two mold halves as defined in claim 1 mated to receive a molding substance.

15. The mold according to claim 14, wherein the cavity is shaped for molding a container.

16. The mold according to claim 14 which is a blow mold.

17. A process of producing a mold half comprising:
    machining a single piece of aluminum or aluminum alloy mold material to provide a mold body comprising a mold cavity defined by a cavity surface having a shape for imparting to a part of a molded article, except at a feature area, the feature area being of smaller dimension than required for the mold half; and
    integrally forming a layer of a metal-matrix composite (MMC) in the feature area to build up the feature area to at least a dimension required for the mold half, the MMC comprising an aluminum-nickel alloy matrix having WC particles embedded therein or an aluminum matrix having TiC particles embedded therein.

18. The process according to claim 17, wherein the MMC layer is formed by first engineering the mold body in which the feature area is machined to an undersized dimension, and then adding MMC material to the feature area to build up the feature to final dimension.

19. The process according to claim 17, wherein the feature area is built up with MMC material beyond final dimension and then machined down to final dimension.

20. The process according to claim 17, wherein the MMC layer is formed by laser cladding.

21. The process according to claim 17, wherein integrally forming comprises forming a metallurgical bond between the metal-matrix composite and the mold material.

22. The process according to claim 19, wherein machining the mold material comprises rough machining an area of the mold material adjacent the feature area, which is also of smaller dimension than required, and both the feature area and the adjacency are machined down to the final dimension which is the shape for imparting to a part of a molded article.

* * * * *